US008743069B2

(12) United States Patent
Morton et al.

(10) Patent No.: US 8,743,069 B2
(45) Date of Patent: Jun. 3, 2014

(54) RECEIVING INPUT AT A COMPUTING DEVICE

(75) Inventors: Michael S. Morton, Lyme, NH (US);
Joseph M. Ashear, Palo Alto, CA (US);
Jeremy Faller, Arlington, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/593,117

(22) Filed: Aug. 23, 2012

(65) Prior Publication Data
US 2013/0057489 A1    Mar. 7, 2013

Related U.S. Application Data

(60) Provisional application No. 61/530,386, filed on Sep. 1, 2011.

(51) Int. Cl.
*G06F 3/041*    (2006.01)
(52) U.S. Cl.
USPC ........... 345/173; 345/156; 345/169; 345/172; 345/158
(58) Field of Classification Search
None
See application file for complete search history.

(56) References Cited

U.S. PATENT DOCUMENTS

| | | | | |
|---|---|---|---|---|
| 5,543,588 A * | 8/1996 | Bisset et al. | ............... | 178/18.06 |
| 5,729,219 A * | 3/1998 | Armstrong et al. | ............. | 341/20 |
| 2002/0140680 A1* | 10/2002 | Lu | .................... | 345/169 |
| 2002/0180767 A1* | 12/2002 | Northway et al. | ............ | 345/698 |
| 2003/0184528 A1* | 10/2003 | Kawasaki et al. | ............. | 345/173 |
| 2003/0234768 A1* | 12/2003 | Rekimoto et al. | ............ | 345/169 |
| 2006/0044281 A1* | 3/2006 | Lai | ................. | 345/173 |
| 2006/0117271 A1* | 6/2006 | Keim | ............. | 715/789 |
| 2007/0013672 A1* | 1/2007 | Shim et al. | ..................... | 345/173 |
| 2007/0229475 A1* | 10/2007 | Gettemy et al. | .............. | 345/173 |
| 2010/0020034 A1* | 1/2010 | Kim | .............................. | 345/173 |
| 2010/0149129 A1 | 6/2010 | Homma et al. | | |
| 2010/0256947 A1 | 10/2010 | Kim et al. | | |
| 2011/0016390 A1* | 1/2011 | Oh et al. | ........................ | 715/702 |
| 2011/0115784 A1 | 5/2011 | Tartz et al. | | |
| 2012/0206350 A1* | 8/2012 | Figaro et al. | .................. | 345/158 |

FOREIGN PATENT DOCUMENTS

| | | |
|---|---|---|
| EP | 1 798 635 | 6/2007 |
| EP | 2 068 237 | 6/2009 |
| EP | 2 163 972 | 3/2010 |
| WO | WO2007/118893 | 10/2007 |

OTHER PUBLICATIONS

Bartlett, J. F. "Rock 'n' Scroll is Here to Stay." Western Research Laboratory Research Report 2000/3, Palo Alto, California, May 2000, 9 pages.

Harrison et al. "Squeeze Me, Hold Me, Tilt Me! An Exploration of Manipulative User Interfaces." Proceedings of the SIGCHI conference on Human factors in computing systems CHI 98, 1998, pp. 17-24.

(Continued)

*Primary Examiner* — Jesus Hernandez
(74) *Attorney, Agent, or Firm* — Fish & Richardson P.C.

(57) ABSTRACT

This document describes technologies for interpreting physical contact with a non-touchscreen portion of a computing device's housing (e.g., the computing device's case) as input. For example, a user tapping his/her index finger against the back of a computing device, such as a smartphone or a tablet computing device, can be interpreted as input and can cause an operation to be performed by the computing device, such as turning the page of an electronic book that is being displayed by the computing device.

22 Claims, 8 Drawing Sheets

(56) References Cited

OTHER PUBLICATIONS

'Photokina-show.com' [online]. "Olympus Stylus 1050 SW," 2008, [retrieved on Jan. 20, 2011]. Retrieved from the Internet: URL<http://www.photokina-show.com/0538/olympus/digitalcameras/digitalcamera/>. 5 pages.

Poupyrev et al. "Ambient Touch: Designing Tactile Interfaces for Handheld Devices." Proceedings of the 15th annual ACM symposium on user interface software and technology, 2002, 4(2):51-60.

Tuck, K. "MMA8450Q Single/Double and Directional Tap Detection," Freescale Semiconductor Application Note AN3919/Rev 0. Freescale Semiconductor, Inc., 2010, Tempe Arizona, pp. 1-16.

Webb, M. 'Interconnected.org' [online]. "Apples Powerbook," 2005, [retrieved on Jan. 20, 2011]. Retrieved from the Internet: URL< http://interconnected.org/home/2005/03/04/apples_powerbook>. 2 pages.

Glenn, "Word 2000 in a nutshell," O'Reilly Media, Inc., 2000, pp. 132-133 (10 pages total).

Siever et al. "Linux in a nutshell, third edition," O'Reilly Media, Inc., 2000, p. 532 (34 pages total).

International Search Report and Written Opinion in International Application No. PCT/US2012/053005, mailed Nov. 7, 2012, 16 pages.

\* cited by examiner

RECEIVING INPUT AT A COMPUTING DEVICE

CROSS-REFERENCE TO RELATED APPLICATIONS

This application claims priority under 35 U.S.C. §119(e) to U.S. Provisional Application Ser. No. 61/530,386, filed on Sep. 1, 2011. The entire contents of which are incorporated herein by reference.

TECHNICAL FIELD

This document generally describes technologies for interpreting input provided to a computing device.

BACKGROUND

Computing devices, such as laptop computers, desktop computers, mobile computing devices (e.g., smartphones, cell phones, personal digital assistants (PDAs)), and tablet computing devices, receive input from users in a variety of ways. For instance, users can provide input to computing devices using keyboards, mice, touchscreens, and microphones.

SUMMARY

This document describes technologies for interpreting physical contact with a non-touchscreen portion of a computing device's housing (e.g., the computing device's case) as input. For example, a user tapping his/her index finger against the back of a computing device, such as a smartphone or a tablet computing device, can be interpreted as input and can cause an operation to be performed by the computing device, such as turning the page of an electronic book that is being displayed by the computing device.

In one implementation, a computer-implemented method includes receiving, at a mobile computing device, first input on a touchscreen of the computing device; in response to receiving the first input, causing a first operation to be performed by the mobile computing device; receiving, at a mobile computing device, second input that indicates that a user contacted a non-touchscreen portion of a housing of the mobile computing device; selecting, by the mobile computing device, a second operation from among a plurality of possible operations based at least in part on the first operation having been previously performed by the mobile computing device within a threshold amount of time or number of operations of receipt of the second input; and causing the second operation to be performed.

This and other implementations can optionally include one or more of the following features. The method can further include determining whether the portion of the housing that the user contacted is a back portion of the mobile computing device that is opposite the touchscreen of the mobile computing device; and the second operation can be selected in response to the determination of whether the back of the mobile computing device was contacted. The method can further include identifying a location on the back portion of the mobile computing device where the user contacted the housing based on the received input; and the second operation can be additionally selected based on the identified location at which the user contacted the back of the mobile computing device.

The location where the user contacted the housing can indicate user intent to navigate forward or backward through a document that includes a plurality of pages; and the second operation can include moving a display of the document on the mobile computing device forward or backward through the plurality of pages. The location where the user contacted the housing can be identified using one or more motion sensors positioned in the mobile computing device. The one or more motion sensors can include one or more accelerometers; and the location can be identified based on an amount of torque measured in association with the received input by the one or more accelerometers relative to locations of the one or more accelerometers in the mobile computing device. The one or more motion sensors can include one or more gyroscopes; and the location can be identified based on an amount of rotation and a direction of rotation in association with the received input that is measured by the one or more gyroscopes relative to locations of the one or more gyroscopes in the mobile computing device. The location where the user contacted the housing can be identified using a plurality of microphones positioned in the housing of the mobile computing device; and the location can be identified based on a correlation of audio signals received by the plurality of microphones relative to locations of the plurality of microphones in the housing of the mobile computing device. The location where the user contacted the housing can be identified using one or more touch sensors that are part of or affixed to the housing on the back of the computing device.

The user may have contacted the non-touchscreen portion of the housing of the mobile computing device with one or more of the user's fingers or thumbs. The second operation can be the same as the first operation. The second operation can be different from the first operation. The mobile computing device can include a smartphone or a tablet computing device. The method can include providing, by the mobile computing device, output that indicates that the second input was received by the mobile computing device. The output can include one or more of: changing a display of the mobile computing device for at least a threshold period of time and providing an audio signal through one or more speakers of the mobile computing device.

The method can further include detecting a level of force with which the second input was provided to the housing of the mobile computing device; and identifying a type of contact for the second input based on a comparison of the level of force with one or more of a plurality of threshold levels of force; where the second operation can be selected further based on the identified type of contact for the second input. When the identified type of contact for the second input is identified as being an ambiguous type of contact the second operation can include a preview operation that provides a preview of another operation on the mobile computing device; where the ambiguous type of contact can be identified based on the level of force being i) equal to or greater than a first threshold level of force and ii) less than a second threshold level of force from the plurality of threshold levels of force. The second operation can be a preview of the first operation that was previously performed on the mobile computing device.

In another implementation, a mobile computing device includes an input subsystem that is programmed to receive i) first input on a touchscreen of the computing device and ii) second input that indicates that a user contacted a non-touchscreen portion of a housing of the mobile computing device; an operation selection module that is programmed to select i) a first operation to perform in response to the first input and ii) a second operation from among a plurality of possible operations based at least in part on the first operation having been previously performed by the mobile computing device within a threshold amount of time or number of operations of receipt of the second input; and a contact interpreter to cause the selected second operation to be performed.

In another implementation, a computer program product embodied in a computer-readable storage device storing instructions that, when executed, cause one or more processors of a computer system to perform operations including receiving first input on a touchscreen of the computer system; in response to receiving the first input, causing a first operation to be performed by the computer system; receiving second input that indicates that a user contacted a non-touchscreen portion of a housing of the computer system; selecting a second operation from among a plurality of possible operations based at least in part on the first operation having been previously performed within a threshold amount of time or number of operations of receipt of the second input; and causing the second operation to be performed.

The details of one or more embodiments are set forth in the accompanying drawings and the description below. Various advantages can be provided by the disclosed systems and methods. For example, users can more conveniently and easily provide input to a computing device. For instance, users generally use two hands to provide input to a computing device with a touchscreen (e.g., a smartphone)—one hand to hold the device and the other hand to touch the touchscreen. However, at times a user may not be able to use two hands to provide input to a computing device, such as when the user is holding another object in one of his/her hands. The features disclosed in this document permit a user to provide input a computing device using a hand that his holding the device without the user having to reconfigure his/her grip on the computing device to reach a touchscreen portion of the device.

In another example, the features disclosed in this document allow a user to dynamically configure the type of operations that are performed in response to the user contacting a non-touchscreen portion of a computing device's housing. Instead of having to enter a settings page for a computing device to specify which operation(s) are to be performed in response to non-touchscreen contact with a computing device, a user can simply perform the action he/she would like to be associated with non-touchscreen contact and the proceed to have the action performed in response to subsequent non-touchscreen contact. This can allow a user to quickly and readily adjust operations that are associated with non-touchscreen contact on a computing device.

In another example, when users contact non-touchscreen portions of computing devices but without sufficient force to trigger an operation (e.g., a dynamically configurable operation), a preview of the operation can be performed on the computing device. For instance, if a computing device is configured to turn a page (example operation) of an electronic book displayed on the computing device in response to receiving contact-based input on the housing of the device but the user does not provide the contact with at least a threshold level of force, then the computing device can provide a preview of the page turn operation on the computing device. For instance, the computing device can display the page of the electronic book starting to change and then falling back into place. Such a preview can allow users to easily discover and learn how to use contact-based input on a computing device. It can be difficult for users to stay up-to-date on all of the varied input that computing devices, such as smartphones, are configured to receive and interpret. By providing previews of operations based on contact-based input, users can discover such contact-based input through inadvertent contact with the housing of a computing device and can also learn how much force (minimum level of force) to provide when contacting the housing so as to cause one or more operations to be performed by the computing device.

Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
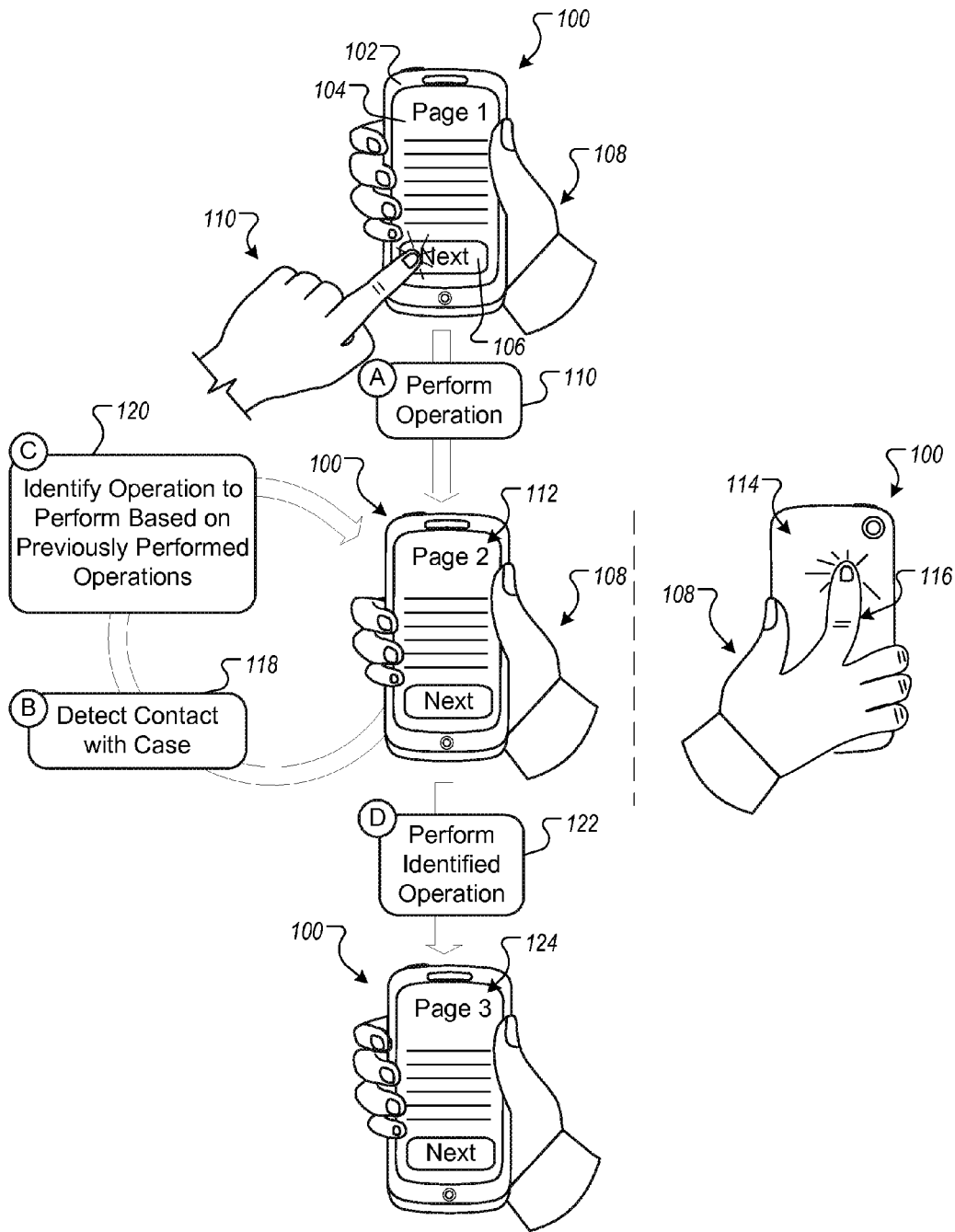
FIG. 1 is a conceptual diagram of an example computing device identifying an operation to perform in response to non-touchscreen contact being detected on a housing of the device.

This document generally describes technologies for identifying one or more operations to perform on a computing device in response to a user contacting (e.g., touching, tapping) a non-touchscreen portion of a computing device. Operations can be identified based on previous operations that were performed in response to other input provided to a computing device, such as a user touching a touchscreen of the device, providing voice input to the device, physically moving the device around (e.g., shaking the device), and/or pressing physical keys or buttons of the computing device.

For example, a user reading an electronic book on a mobile computing device, such as a smartphone, a tablet computing device, and/or an electronic book reader, can provide input (e.g., touchscreen input, pressing a key or button) to the device that causes the device to turn to the next page of the electronic book. When a user subsequently contacts a non-touchscreen portion of the mobile computing device's housing, the mobile computing device can identify the page turning operation as the operation to perform in response to the contact based on the user having previously provided input that caused the page turn operation to be performed. For instance, after turning the page of the electronic book once using the standard input mechanism provided by the computing device (e.g., touchscreen, keyboard, button), a user can repeatedly tap the housing of the computing device to cause the page of the electronic book to be turned. A mobile computing device's housing can include outer portions of the mobile computing device that do not have input mechanisms, such as buttons, touchscreens, or switches. For instance, a mobile computing device's housing can include a case that surrounds one or more sides of the mobile computing device.

Contacting a mobile computing device's housing can include user contact with the housing (e.g., tapping the back portion of the mobile computing device's case) as opposed to interaction with an input mechanism (e.g., pressing a button, activating a switch, touching a touchscreen).

A variety of techniques can be used to detect user contact with a non-touchscreen portion of an appropriate computing device, such as a smartphone, a tablet computing device, an electronic book reader, a netbook, and/or a laptop computer. For example, user contact with the housing of a computing device can be detected using one or more capacitive touch sensors can be placed in and/or affixed to the housing of a computing device; one or more accelerometers included in the computing device to detect acceleration of the device; one or more gyroscopes included in the computing device to detect changes in the orientation of the device; one or more microphones included with the computing device to detect sound associated with device contact; and/or one or more cameras included with the computing device to identify user movement with regard to the computing device. Other sensors not included in this list can also be used.

The location on the housing of a computing device at which a user contacted the housing can be identified and used to further identify an operation to perform in response to a user contacting a non-touchscreen portion of a computing device's housing. For instance, if a user taps the back of a smartphone at a location that is opposite the right half of the smartphone's touchscreen display, the tap can cause a different operation to be performed than if the user taps the back of the smartphone at a different location opposite the left half of the smartphone's touchscreen display. Referring to the electronic book example above, touching a location opposite the right half of the touchscreen can cause a next page of the electronic book to be displayed and touching a location opposite the left half of the touchscreen can cause a previous page of the electronic book to be displayed. Although this example is described with regard to tapping a back portion of a smartphone, tapping other portions of the smartphone, like the sides of the mobile computing device, can also cause the smartphone to perform operations such as turning a page in an electronic book.

The location at which a user has contacted (e.g., with the user's fingers, thumb, knuckle, knee, other body part, and/or with inanimate objects such as pens, books, furniture) a non-touchscreen portion of a computing device's housing can be determined in a variety of ways. For example, a plurality of accelerometers can be placed throughout the device to measure acceleration at various points in the device and can be used to determine torque being applied to the device. Rotation about an axis of the device can provide an indication of where on the device a user contacted the housing. In another example, gyroscopes can be placed throughout a device to determine changes in orientation of the device, which can also provide an indication of device rotation. In another example, microphones can be placed at different locations and different sound measurements received by the microphones in association with a user contacting the housing can be correlated to determine an approximate location where the user contacted the housing. In a further example, touch sensors can be located in and/or affixed to the housing of a device and can provide an indication of where a user contacted the housing.

Filters can be applied to information indicating that a user contacted a housing of a computing device to filter out unintentional contact. For example, incidental contact may be detected by a computing device, such as setting the computing device on a table. However, such incidental contact can be filtered out if it does not register at least a threshold level of inferred intent from the user for an operation to be performed. For example, a minimum threshold of acceleration may be used to differentiate between incidental and/or ambiguous contact, for which an operation should not be performed, and intentional contact (e.g., a user tapping a finger against the housing of the device), for which an operation should be performed. Contact that is in excess of a normal range of a user action can be filtered out as well. For example, if a user drops his/her computing device, the acceleration (or deceleration) from the device falling and/or hitting the ground may exceed a normal amount of acceleration associated with user contact. A maximum threshold for acceleration can be used to filter out such accidental contact, for which an operation should not be performed.

Feedback can also be provided to a user in response to non-touchscreen housing contact being detected and an operation being identified in association with the contact. For example, a computing device can provide audio output indicating that the non-touchscreen housing contact has been detected and not filtered out. In another example, a computing device can momentarily change its display (e.g., briefly brighten the display, briefly dim the display) in response to the detection of non-touchscreen housing contact.

FIG. 1 is a conceptual diagram of an example computing device 100 identifying an operation to perform in response to non-touchscreen contact being detected on a housing of the device 100. The computing device 100 can be any of a variety of appropriate computing devices, such as a smartphone, a tablet computing device, an electronic book reader, a netbook, and/or a laptop computer. The computing device 100 is depicted as including a non-touchscreen housing 102 and a touchscreen 104. In the depicted example, the touchscreen is displaying a page of information that includes a graphical button 106 to move to the next page.

As depicted in FIG. 1, the user is holding the computing device 100 in the user's right hand 108 and touches the graphical button 106 with the index finger from his/her left hand 110. In response to receiving the touchscreen input corresponding the graphical button 106, an operation is performed in association with the received input, as indicated by step A (110). For example, the operation performed in response to the user touching the button 106 is for a next page of the document to be retrieved and displayed in the touchscreen of the computing device 100, as indicated by the display 112. The example display 112 shows "Page 2" of the document being displayed on the computing device 100.

After providing the input that caused the next page operation to be performed and while holding the device 100 in the right hand 108, the user taps the back portion 114 of the housing (opposite the touchscreen 104) of the device 100 with the user's right index finger 116. This contact is detected by the computing device 100, as indicated by step B (118). As explained above, a variety of sensors in the computing device can be used to detect the contact, such as accelerometers, gyroscopes, capacitive touch sensors, microphones, and/or cameras.

In response to detecting the contact with the case, an operation to be performed is identified based on previously received input and/or performed operations in response to such input, as indicated by step C (120). For example, one or more previous operations performed by the computing device 100 in response to user input can be used to identify an operation to perform in response to the contact on the back portion 114 of the device 100. In some implementations, the previous operation performed in response to user input is identified. In the present example, such an identified operation would be the next page operation. In some implementations, a sequence of previous operations performed in response to user input is analyzed to identify an operation intended by the user. For example, a user's historical behavior with regard to the computing device 100 can be analyzed to identify patterns. If the sequence of previous operations matches one of these patterns, a next intended operation can be inferred and identified from the patterns.

In the depicted example, the previous operation performed in response to the graphical button 106 being pressed is identified for the non-touchscreen contact on the back 114 of the device 100. As indicated by step D (122), the identified operation (the next page operation) is performed and a next page 124 ("Page 3") of the document is displayed by the computing device 100. As demonstrated by FIG. 1, the transition between the second page 112 and the third page 124 of the document occurs without the user having to use the left hand 110 or having to press the graphical button 106 a second time.

Figure 2:
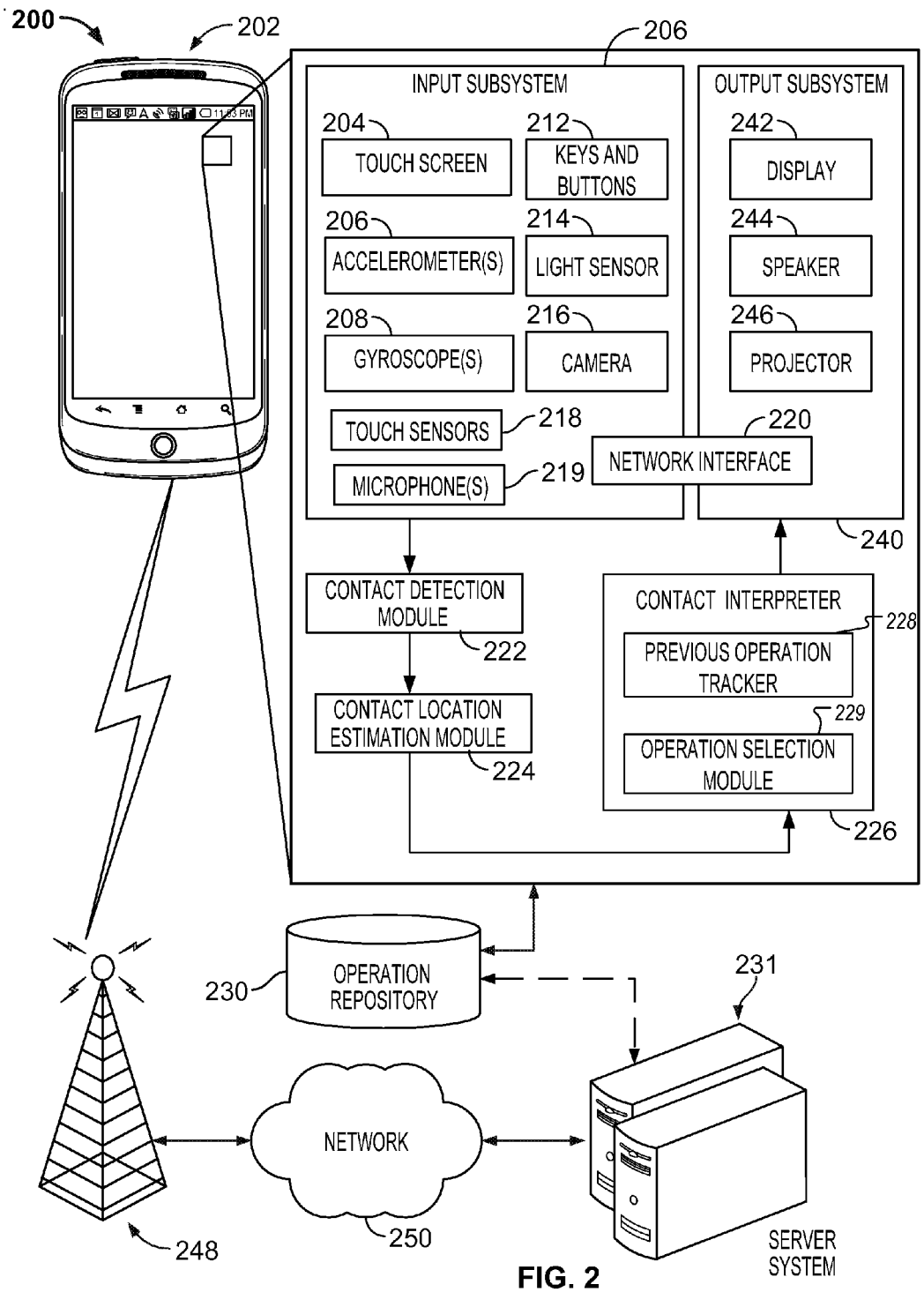
FIG. 2 is a diagram of an example system for identifying an operation to perform in response to non-touchscreen contact being detected on a housing of a computing device.

FIG. 2 is a diagram of an example system 200 for identifying an operation to perform in response to non-touchscreen contact being detected on a housing of a computing device 202. The computing device 202 can be similar to the computing device 100 discussed above with regard to FIG. 1.

The computing device 202 includes an input subsystem 206 that is configured to receive input (both non-touchscreen housing contact with the device 202 and traditional user input to the device 202, such as keyboard input and touchscreen input). The input subsystem 206 can include any combination of the components that are depicted as being part of the subsystem 206. The input subsystem 206 can include a touchscreen 204 (e.g., a capacitive touchscreen, resistive touchscreen, an infrared touchscreen, etc.), one or more accelerometers 206, one or more gyroscopes 208, keys and/or buttons 212 (e.g., physical keypad, buttons on the exterior of the device 202), a light sensor 214, a camera 216, touch sensor(s) 218 that are part of and/or affixed to the non-touchscreen housing of the device 202, one or more microphones 219, and a network interface 220.

The network interface 220 interacts with computing systems that are external to the mobile computing device 202 to send and receive electronic information. The network interface 220 can be any of a variety of appropriate networking interfaces (e.g., Ethernet card, wireless network card, cellular transmitter, etc.) that are capable of sending and receiving information over a network (e.g., local area network (LAN), the Internet, wireless network, peer-to-peer network, cellular network, 3G network, etc.).

Input received through the input subsystem 206 of the mobile computing device 202 can be provided to a contact detection module 222 that detects non-touchscreen contact with the housing of the computing device 202. The contact detection module 222 can use input from any or all of the components of the input subsystem 206 to determine whether a user has provided contact indicating that an operation should be identified and performed. Filters on contact-related input received from the input subsystem 206 can be used to differentiate between incidental and accidental contact, for which an operation should not be performed, and intentional contact (e.g., a user touching the touchscreen), for which an operation should be performed.

A contact location estimation module 224 can be used to identify a location on the housing of the device 202 where the user touched the touchscreen. A contact interpreter 226 identifies an operation to perform in response to the received non-touchscreen contact. The contact interpreter includes a previous operation tracker 228 that tracks previous user input received by the device 202 and corresponding previous operations performed by the device 202 in response. The operation selection module 229 select one or more operations to perform in response to received non-touchscreen contact. The operation selection module 229 can selection operations to perform from an operation repository 230, which stores information identifying operations that are available to be performed by the computing device 202. Operation(s) that is selected can depend on one or more applications and/or features that are currently being displayed by the computing device 202. The output selection module 229 can additional cause the one or more selected operations to be performed by the device 202.

An output subsystem 240 provides output to a user of the mobile computing device 202 in conjunctions with the performance of the selected operation. For example, the output subsystem 240 can cause the touchscreen 204 to display a next page of an electronic book. The output subsystem 240 can include a variety of devices for providing output to a user of the mobile computing device 202, such as a display 242 (which may be included as part of the touchscreen 204), a speaker 244, and a projector 246.

The mobile computing device 202 can wirelessly communicate with wireless transmitter 248 (e.g., a cellular network transceiver, a wireless network router, etc.) and obtain access to a network 250 (e.g., the Internet, public switched telephone network (PSTN), a cellular network, a local area network (LAN), a virtual private network (VPN), etc.). Through the network 250, the mobile computing device 202 can be in communication with a mobile device server system 231 (one or more networked server computers), which can be configured to provide mobile device related services and data to the mobile device 202 (e.g., provide calendar data, email data, connect telephone calls to other telephones, etc.). Through the wireless transmitter 248 and the network 250, the mobile device server system 231 can implement some of the features described above with regard to the mobile computing device 202, identifying an operation to perform from the operation repository 230 in response to non-touchscreen housing contact.

Figure 3:
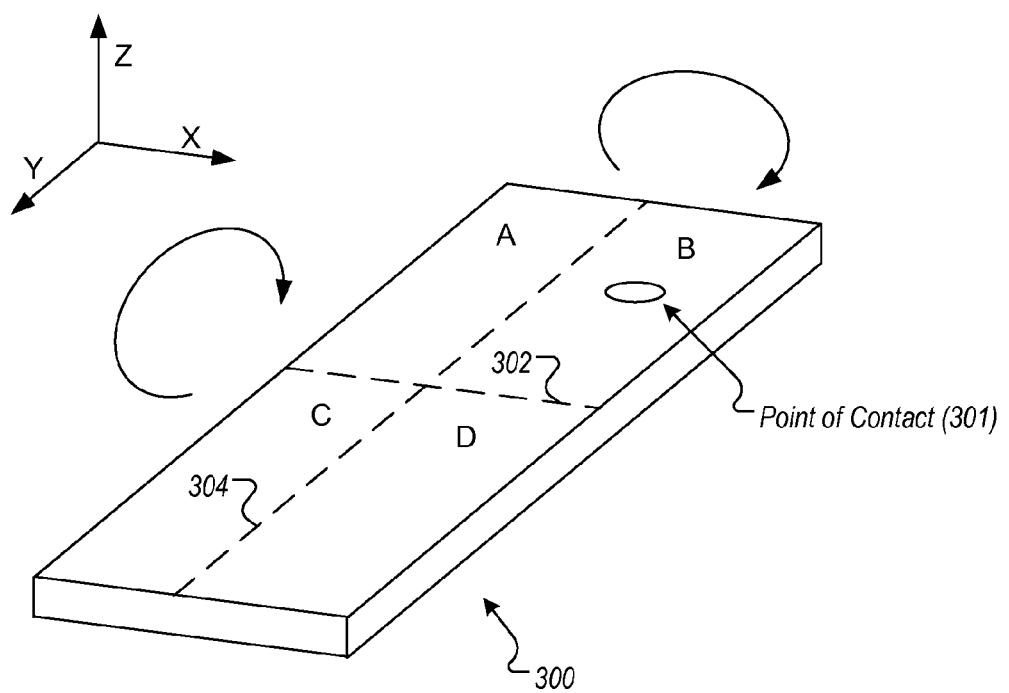
FIG. 3 is a conceptual diagram indicating how detected torque on a computing device can indicate a location on the device where contact with the device was received.

FIG. 3 is a conceptual diagram indicating how detected torque on a computing device 300 can indicate a location on the device where contact with the device was received. The computing device 300 can be similar to the computing device 100 and/or the computing device 202 discussed above with regard to FIGS. 1 and 2, respectively.

In the example depicted in FIG. 3, the housing of the computing device 300 is contacted by a user at the point of contact 301. For example, the user may contact the back of the computing device 300 with his/her finger. Resulting from the contact at point 302, rotation is detected about the x-axis 302 of the device and the y-axis 304. As indicated in this example, the rotation on the x-axis 302 is clockwise and the rotation on the y-axis 304 is clockwise. As discussed above, the rotation about the x-axis 302 and the y-axis 304 can be detected using any of a variety of sensors, such as accelerometers and/or gyroscopes. Based on the detected directional rotation of the x-axis 302 and the y-axis 304, the point of contact 301 can be estimated to be somewhere within the quadrant B of the device 300. The amount of torque detected along each axis can provide an additional indication as to a location where the point of contact occurred with the identified quadrant B.

Figure 4:
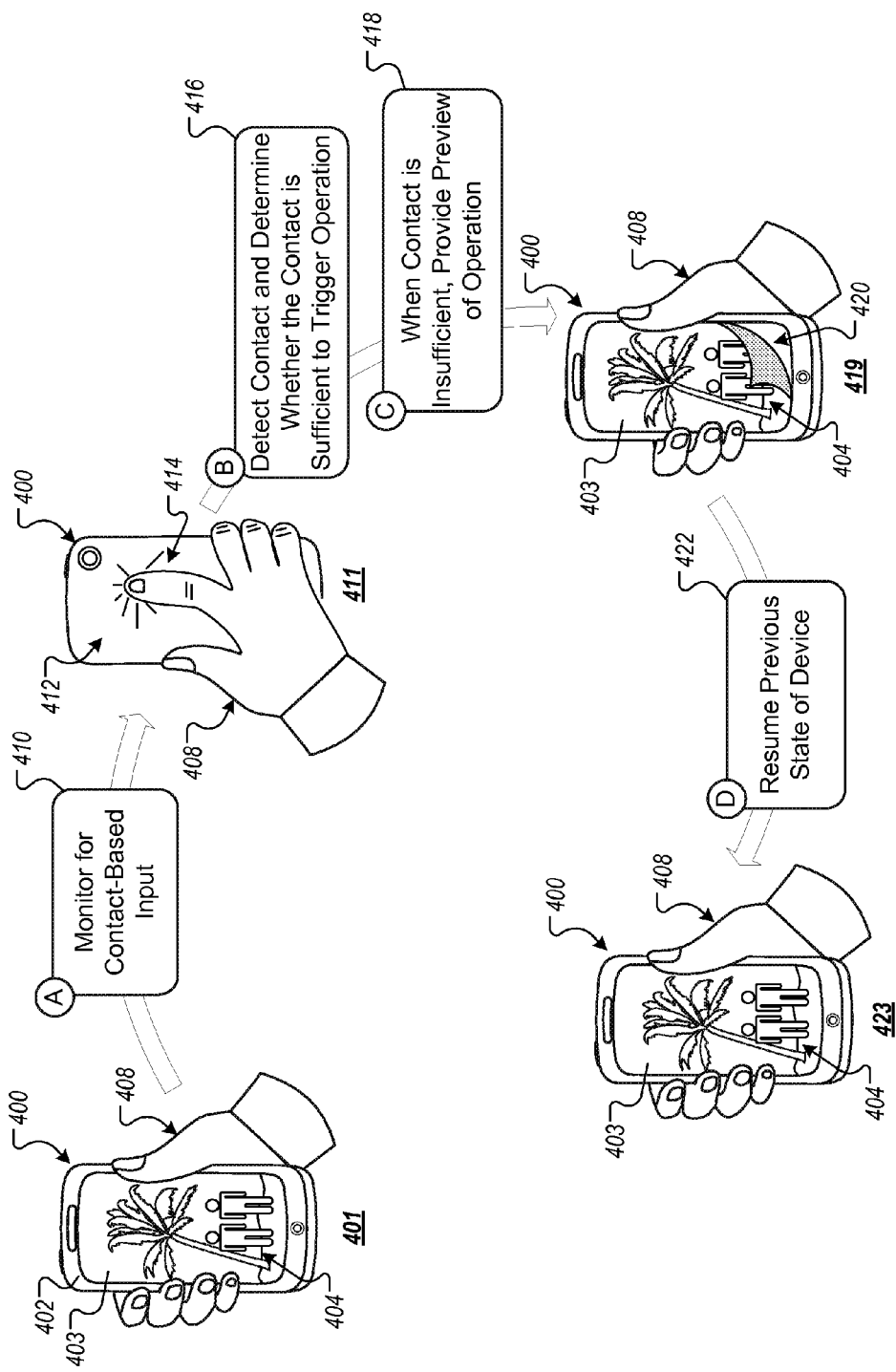
FIG. 4 is a conceptual diagram of an example computing device providing a preview of an operation in response to non-touchscreen contact being detected on a housing of the device.

FIG. 4 is a conceptual diagram of an example computing device 400 providing a preview of an operation in response to non-touchscreen contact being detected on a housing of the device 400. The diagram depicted in FIG. 4 shows the computing device 400 providing a preview of an operation through four different points in time—at a first time (401)

when the computing device 400 is displaying an image 404 on a display 403, at a second time (411) when the computing device 400 is receiving input through contact with a housing 402 of the device, at a third time (419) when device 400 is providing a preview of an operation based on the contact input in response to the detected contact being insufficient to perform the operation, and at a fourth time (423) when the computing device 400 resumes displaying the image 404.

The computing device 400 can be any of a variety of appropriate computing devices, such as a smartphone, a PDA, and/or cell phone, a tablet computing device. The example computing device 400 can be similar to the other computing devices discussed in this document, such as the computing device 100, the computing device 202, and/or the computing device 302. The computing device 400 is depicted as including the housing 402 and the display 403. The housing 402 can be made of any of a variety of appropriate materials, such as plastics and/or metal alloys, and may not include touch sensors included and/or embedded therein. The housing 402 can be similar to the non-touchscreen housings discussed above with regard to the mobile computing devices 100 and 202. The display 403 can be any of a variety of appropriate visual displays, such as a touchscreen display. The display 403 can be similar to the touchscreen 104 and/or the display 242 discussed above with regard to FIGS. 1 and 2, respectively.

At a first time (401), the computing device 400 displays the example image 404 on the display 403 of the computing device 400. As depicted in the example, a user is holding the device 400 in his/her right hand 408. The image 404 can be presented on the display 403 by any of a variety of appropriate operations that are running on the mobile computing device 400, such as a photo viewer application that displays photos on the display 403 and that includes various input controls through which a user can display a next or previous photo in a collection of photos (e.g., a photo album, tagged photos). For example, a user may be able to swipe from left to right across the display 403 to view a next photo in the collection and to swipe from right to left across the display 403 to view a previous photo in the collection. The mobile computing device 400 can perform housing contact-based operations, similar to those discussed above with regard to FIGS. 1-3. For instance, if a user of the mobile computing device 400 swipes left to right to transition to a next photo in a collection of photos, the mobile computing device 400 may interpret subsequent contact with the housing 402 as user input requesting that the previous operation (next photo operation) be performed and can cause the next photo operation to be performed (e.g., for a next photo to be presented on the display 403).

The mobile computing device 400 can monitor for contact-based input provided by user contact with the housing 402, as indicated by step A (410). For example, the contact detection module 222 of the mobile computing device 202 can monitor for housing-based contact with the mobile computing device 202 based on information provided by the input subsystem 206.

At a second time (411), the user contacts a back portion 412 of the housing 402 (opposite the display 403) of the device 400 with the index finger 414 of the user's right hand 408. A user can contact anywhere on the housing 402 of the mobile computing device 400, including the back portion 412, which is provided as an illustrative example. The mobile computing device 400 can detect the contact with the housing 402 and can determine whether the contact was provided with sufficient force so as to cause a previous operation to be performed, as indicated by step B (416). The mobile computing device 400 can detect contact with the housing 402 similar to the techniques discussed above with regard to step B (118) in FIG. 1, the contact detection module 222 and the contact location estimation module 224 in FIG. 2, and the contact location detection discussed with regard to the computing device 300 in FIG. 3. The mobile computing device 400 can determine whether the user has contacted the housing 402 with sufficient force to trigger performance of the previous operation (e.g., swipe left to right across the display 403) based on a comparison of the force exerted on the mobile computing device 400, as detected by one or more accelerometers of the mobile computing device 400, with one or more threshold levels of force (e.g., minimum levels of force to perform an operation based on contact with the housing 402).

For example, the mobile computing device 400 can include one or more accelerometers (e.g., the one or more accelerometers 206) that sense changes in movement of the mobile computing device 400 and that provide real-time data detailing the changes in the device's movement in any of a variety of appropriate units (e.g., g-force, specific force). Various threshold levels of force can be used to differentiate between types of contact. For example, the mobile computing device 400 may use two threshold levels of force to distinguish between ambient contact/movement (e.g., vibration caused by the device 400 being in a motor vehicle with the engine on), ambiguous contact (e.g., a light tap on the housing 402 by the user's finger 414 that produces little, if any, audible sound from the contact), and intentional contact (e.g., a more forceful tap on the housing 402 by the user's finder 414 that produces a distinct audible sound from the contact). For instance, contact that is detected by the mobile computing device 400 as having been provided with less than a first threshold level of force can be determined to be ambient contact/movement of the mobile computing device 400, contact that is detected by the mobile computing device 400 as having been provided with at least the first threshold level of force but with less than a second threshold level of force can be determined to be ambiguous contact, and contact that is detected by the mobile computing device 400 as having been provided with at least the second threshold level of force can be determined to be intentional contact.

Based on a type of contact that was detected (e.g., ambient contact/movement, ambiguous contact, intentional contact), the mobile computing device 400 can determine whether to not perform an operation (e.g., in response to determining that contact with the housing 402 was ambient contact/movement), to perform a preview of an operation such as a previous operation (e.g., in response to determining that contact with the housing 402 was ambiguous contact), or to perform a previous operation (e.g., in response to determining that the contact with the housing 402 was intentional). For example, if the contact with the housing 402 is determined to be intentional contact, the mobile computing device 400 can perform a previous operation, such as presenting a next or previous photo in a collection of photos on the display 403. In another example, if the contact with the housing 402 is determined to be ambiguous, the mobile computing device 400 can perform a preview of a previous operation, such as displaying an animation of a corner of the image 404 being lifted up/turned (like turning a page in a physical photo album) and then falling back into place. By providing such a preview operation in response to ambiguous contact (contact with less than a threshold level of force) with the housing 402 of the mobile computing device 400, the mobile computing device 400 can allow for a user to organically discover (e.g., user can discover without formal instruction) and learn how to use housing contact-based inputs features.

In the depicted example in FIG. 4, the user contacting the housing 402 with his/her finger 414 is determined to be insufficient (e.g., less than a threshold level of force—indicating that the contact with the housing 402 was ambiguous contact) to cause the housing contact-based operation (e.g., displaying a next photo in a collection of photos) to be performed and, in response, the mobile computing device determines that a preview of such an operation (e.g., the previous operation performed by the mobile computing device 400) should be performed, as indicated by step C (418). An example preview operation is depicted at a third time (419) by the right corner 420 of the image 404 being changed/animated on the display 403 to show the image 404 beginning to be lifted up/turned and then falling back into place, as depicted at a fourth time (423) when the mobile computing device 400 resumes its previous state of displaying the image 404, as indicated by step D (422).

Any of a variety of appropriate preview operations can be performed depending on the type of operation that the device is previewing. For example, if the previous operation performed by the mobile computing device 400 is an operation that causes a next song from a group of songs (e.g., a playlist, an album) to be played, the mobile computing device 400 may output a beeping noise or play a few seconds of the next song in response to detecting ambiguous contact with the housing 402. Preview operations can also be selected and performed based on a location on the housing 402 at which the user contacted the mobile computing device 400, as described above with regard to FIGS. 2-3. For example, if the user provides ambiguous contact on a right side of the back portion 412 of the housing 402 and a page of an electronic book is being presented on the display 403, the mobile computing device may provide a preview of a turning to a next page of the electronic book (e.g., an animation of the page turning and then falling back can be presented on the display 403).

Figure 5A:
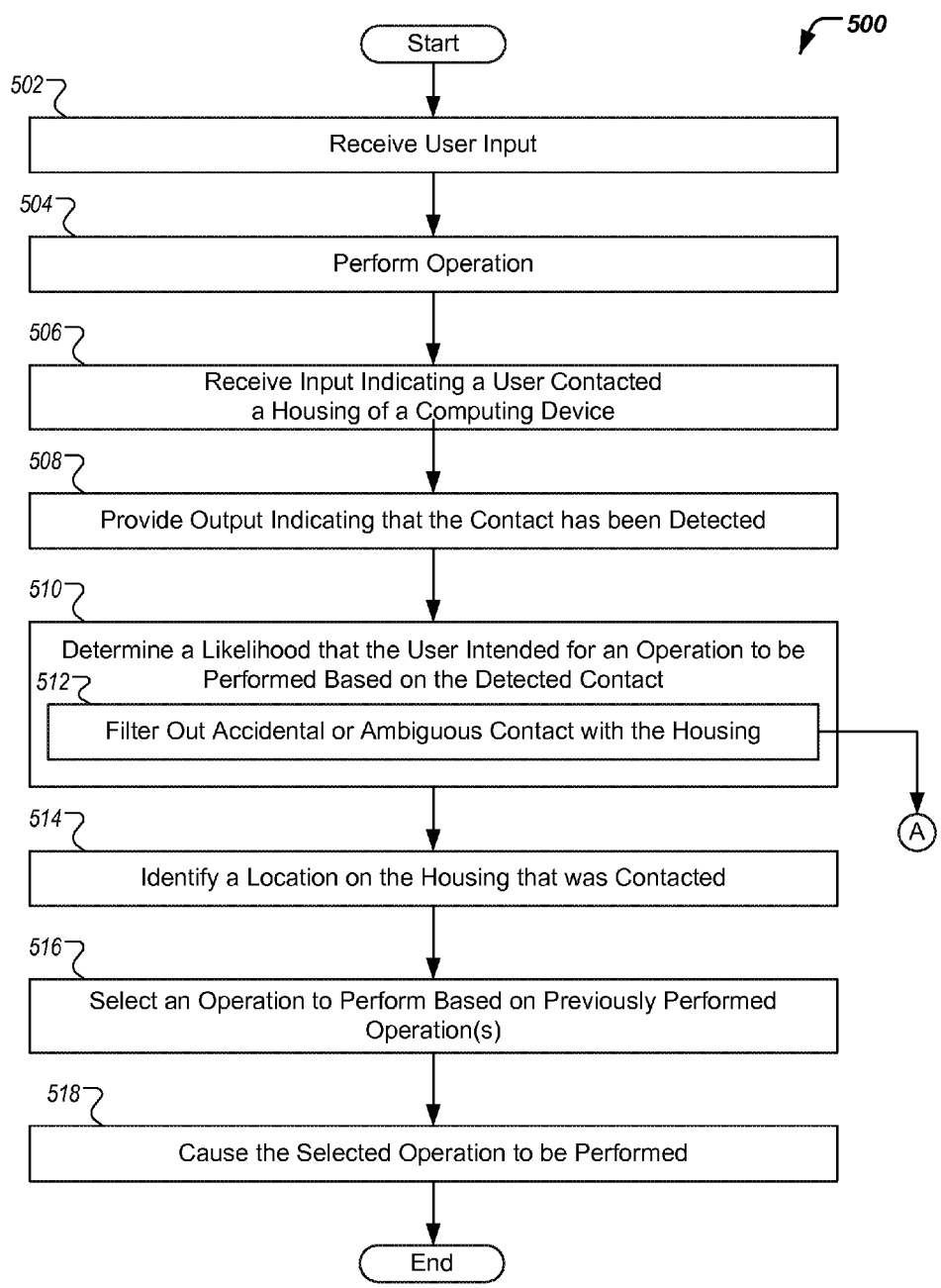
FIGS. 5A-B are flowcharts of an example process for or identifying an operation to perform in response to non-touchscreen contact being detected on a housing of a computing device.
Figure 5B:
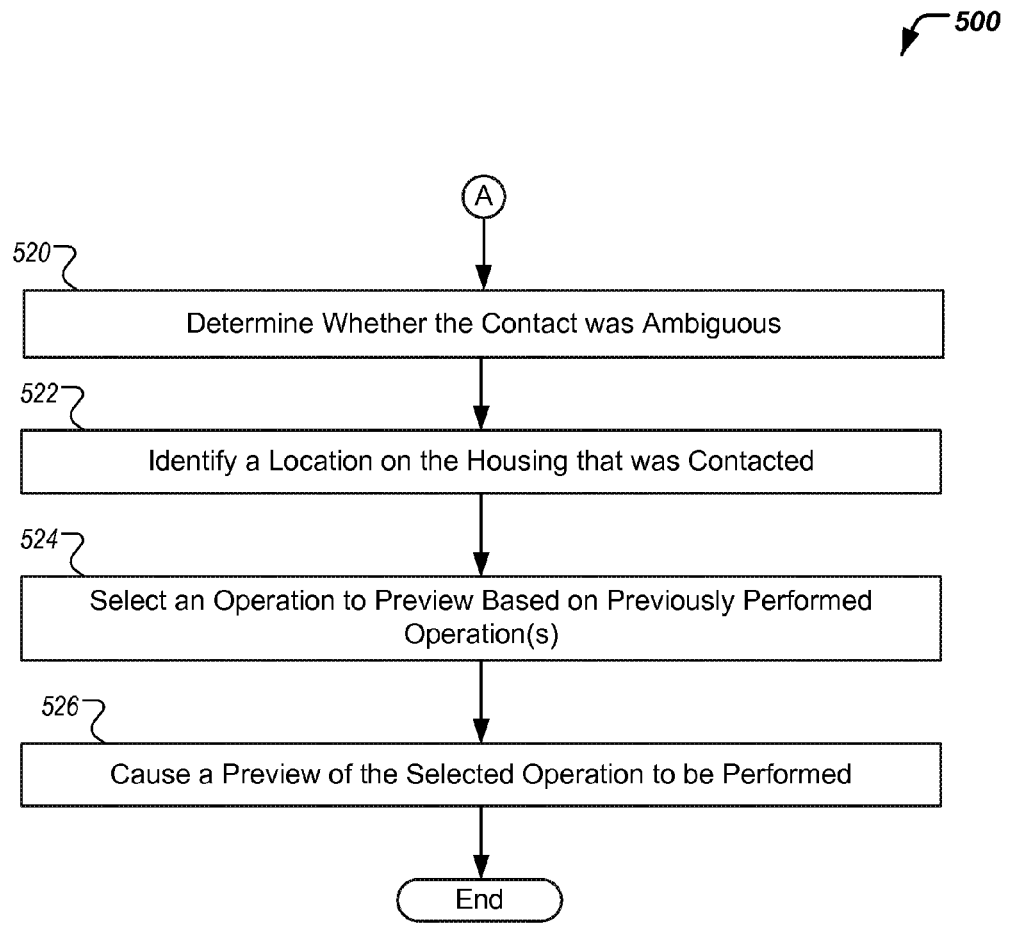

FIGS. 5A-B are flowcharts of an example process 500 for or identifying an operation to perform in response to non-touchscreen contact being detected on a housing of a computing device. The process 500 can be performed by any of a variety of appropriate computing devices, such as the computing device 100, the computing device 202, the computing device 302, and/or the computing device 400.

As part of the process 500, user input is received (502) and an operation is performed in response to the user input (504). For example, the mobile computing device 100 can receive input from the user touching the graphical button 106 displayed on the touchscreen 104 using his/her left hand 110 and, in response, can display a next page in an electronic book, as indicated by example display 112, on the touchscreen 104.

Input can be received indicating that a user contacted a non-touchscreen portion of a housing of a computing device (506). For example, the mobile computing device 100 can use one or more sensors, such as accelerometers, to detect the user contacting (e.g., tapping) on the back portion 114 of the housing 102 of the mobile computing device 100 with his/her right index finger 116. Output can be provided to indicate that the contact with the housing has been detected by the computing device (508). For example, the mobile computing device 100 may provide visual, audible, and/or tactile feedback to the user indicating that the tap input on the housing 102 of the device 100 has been detected, such as outputting a particular audio signal through one or more speakers of the device 100 (e.g., outputting a click sound, outputting a beep sound), altering the content displayed on the touchscreen 104 (e.g., momentarily making the content displayed on the touchscreen 104 brighter or darker, displaying over a portion of the content displayed on the touchscreen 104 a semi-transparent icon or message indicating that the housing contact has been received), and/or causing the device 100 to vibrate.

A determination can be made as to a likelihood that the user intended for an operation to be performed based on the detected contact with the housing (510). For example, the mobile computing device 400 can determine whether the contact was provided with sufficient force to indicate user intent to perform a particular operation by comparing the force of the detected contact with one or more threshold levels of force, as indicated by step B (416). Such a determination can be made by filtering out accidental, incidental, and/or ambiguous contact with the housing (512). For example, as described above with regard to step B (416), multiple threshold levels of force can be used to differentiate between incidental/ambient contact (e.g., contact detected from placing the device 400 in a pocket/bag), accidental contact (e.g., dropping the device 400 on the ground from a foot or two off the ground), ambiguous contact (e.g., light tapping contact on the housing 402), and/or intentional contact (e.g., forceful tapping contact on the housing 402). Contact that is determined to be incidental, accidental, and/or ambiguous can be handled according to steps 520-526, which are described below with regard to FIG. 5B.

In response to determining that contact with a device's housing was likely intentionally provided by the user, a location on the housing where the contact was detected can be identified (514). For example, the location of the point of contact 301 on the mobile computing device 300 can be detected based on rotation of the device 300 about the x-axis 302 and/or the y-axis 304.

An operation can be selected based on previously performed operations and/or a location where the contact was detected (516). For example, the mobile computing device 100 can identify the next page operation (display a next page in an electronic book) based on the detected contact with the housing 102 of the mobile computing device 100 and the determination that the detected contact was likely intentional (e.g., not ambiguous or accidental contact with the housing 102). In another example, a next page operation may be identified by the mobile computing device 100 when the detected contact is on a right side of the mobile computing device 100 (right side of the device 100 from the user's perspective when viewing the front/touchscreen 104 of the device 100) and a previous page operation may be identified when the detected contact is on a left side of the mobile computing device.

The identified operation can be performed (518). For example, the mobile computing device 100 can display a next page of the electronic book, as indicated in the display 124 after the contact with the back portion 114 of the housing 102 was detected by the mobile computing device 100.

Referring to FIG. 5B, a determination can be made as to whether the detected contact was ambiguous (520). For example, the mobile computing device 400 can determine whether the detected contact with the housing 402 was ambiguous based on a comparison of the detected force of the contact with one or more threshold levels of force. As discussed above with regard to FIG. 4, the mobile computing device 400 may determine that the contact is ambiguous when it is provided with at least a first threshold level of force but less than a second threshold level of force. Such a first threshold level of force can distinguish between incidental contact (e.g., placing the device 400 on a table) and ambiguous contact (e.g., light tap from the user's finger 414), and such a second threshold level of force can distinguish between ambiguous contact and intentional contact (e.g., forceful tap from the user's finger 414). Such threshold levels can be predetermined and/or determined by the mobile computing device 400 over time. For example, corrective behavior by the user (e.g., providing touchscreen input in response to the housing contact not resulting in the expected or intended operation being performed) in response to an operation performed (or not performed) by the mobile computing device 400 can be used to adjust and/or create threshold force levels to correspond to the force with which the corrected housing contact was provided.

The step 520 may be performed for contact that has not been determined to be intentional, such as contact that may be incidental, ambiguous, and/or accidental. If the contact is determined to be incidental or accidental, the contact may be ignored and no operation may be performed in response to the contact. If the contact is determined to be ambiguous, a location on the housing that was contacted can be identified (522), similar to step 514 described above. Based on previously performed operations and/or a location at which the housing was contacted, an operation to preview can be selected (524). For example, the mobile computing device 400 can identify an operation to preview based on a next photo operation (e.g., caused by swiping across the display 403) that was previously performed. In another example, the mobile computing device 400 can identify an operation to preview based on a location on the back portion 412 of the housing 402 that was contacted by the user's finger 414, such as a next page or previous page operation.

A preview of the selected operation can be performed (526). For example, the mobile computing device 400 can perform a preview of a transition to a next image by animating the corner 420 of the image 404 beginning to turn/fold over at the third time (419) and then falling back down so that the device 400 returns to its previous state at the fourth time (423).

Figure 6:
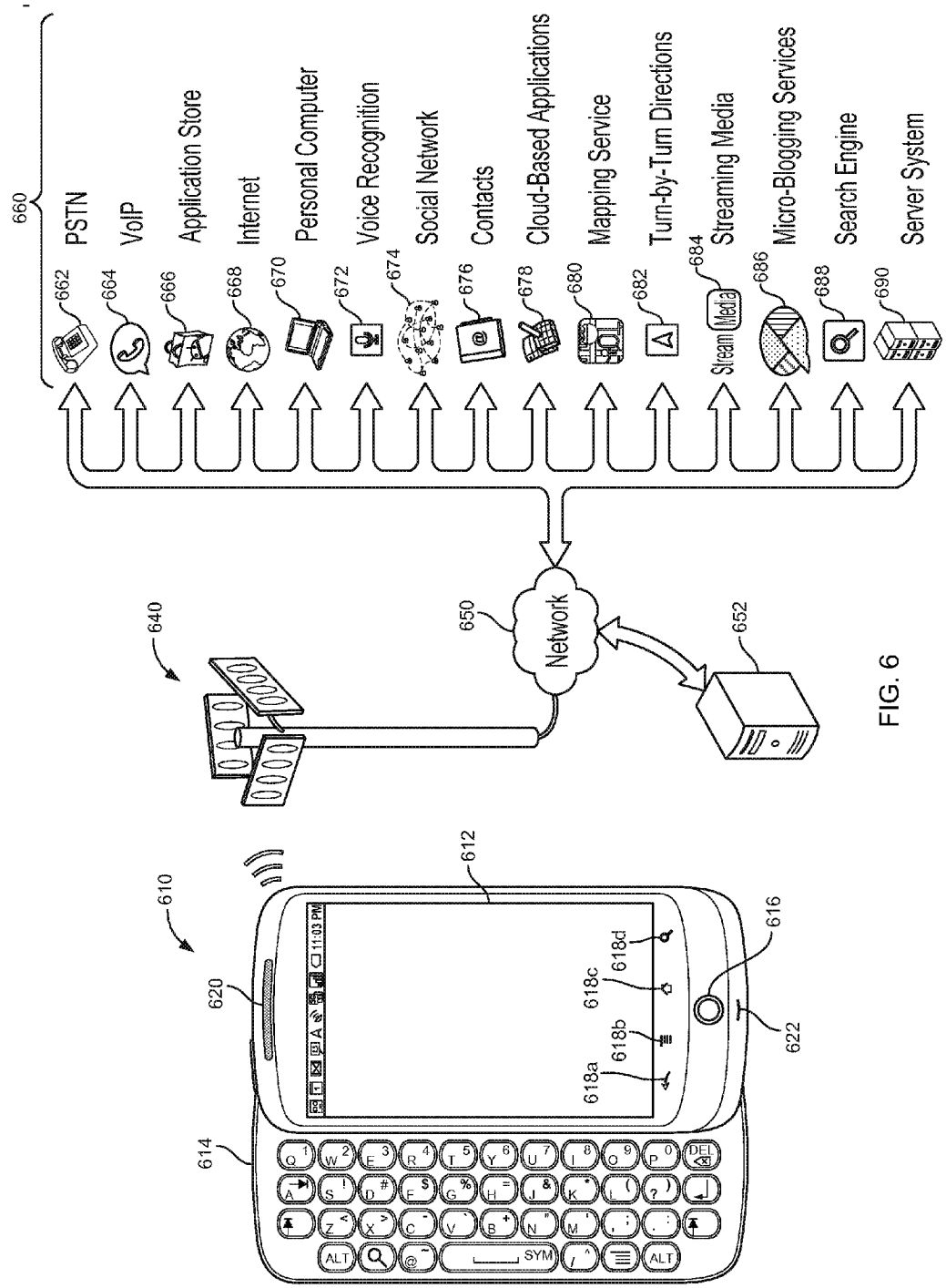
FIG. 6 is a conceptual diagram of a system that may be used to implement the systems and methods described in this document.

FIG. 6 is a conceptual diagram of a system that may be used to implement the systems and methods described in this document. Mobile computing device 610 can wirelessly communicate with base station 640, which can provide the mobile computing device wireless access to numerous services 660 through a network 650.

In this illustration, the mobile computing device 610 is depicted as a handheld mobile telephone (e.g., a smartphone or an application telephone) that includes a touchscreen display device 612 for presenting content to a user of the mobile computing device 610. The mobile computing device 610 includes various input devices (e.g., keyboard 614 and touchscreen display device 612) for receiving user-input that influences the operation of the mobile computing device 610. In further implementations, the mobile computing device 610 may be a laptop computer, a tablet computer, a personal digital assistant, an embedded system (e.g., a car navigation system), a desktop computer, or a computerized workstation.

The mobile computing device 610 may include various visual, auditory, and tactile user-output mechanisms. An example visual output mechanism is display device 612, which can visually display video, graphics, images, and text that combine to provide a visible user interface. For example, the display device 612 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 612). Further, the mobile computing device 610 may include one or more speakers 620 that convert an electrical signal into sound, for example, music, an audible alert, or voice of an individual in a telephone call.

An example mechanism for receiving user-input includes keyboard 614, which may be a full qwerty keyboard or a traditional keypad that includes keys for the digits '0-9', '*' and '#.' The keyboard 614 receives input when a user physically contacts or depresses a keyboard key. User manipulation of a trackball 616 or interaction with a trackpad enables the user to supply directional and rate of rotation information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618a-d. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE's iOS operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

In some examples, the operating system provides a "desktop" user interface that is displayed upon turning on the mobile computing device 610, activating the mobile computing device 610 from a sleep state, upon "unlocking" the mobile computing device 610, or upon receiving user-selection of the "home" button 618c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 610 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 612 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. Unlike an application program, which may not be invoked until a user selects a corresponding icon, a widget's application program may start with the mobile telephone. Further, a widget may not take focus of the full display. Instead, a widget may only "own" a small portion of the desktop, displaying content and receiving touchscreen user-input within the portion of the desktop.

The mobile computing device 610 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 610 may include other application modules and hardware. A call handling unit may receive an indication of an incoming telephone call and provide a user capabilities to answer the incoming telephone call. A media player may allow a user to listen to music or play movies that are stored in local memory of the mobile computing device 610. The mobile telephone 610 may include a digital camera sensor, and corresponding image and video capture and editing software. An internet browser may enable the user to view content from a web page by typing in an addresses corresponding to the web page or selecting a link to the web page.

The mobile computing device 610 may include an antenna to wirelessly communicate information with the base station 640. The base station 640 may be one of many base stations in a collection of base stations (e.g., a mobile telephone cellular network) that enables the mobile computing device 610 to maintain communication with a network 650 as the mobile computing device is geographically moved. The computing device 610 may alternatively or additionally communicate with the network 650 through a Wi-Fi router or a wired connection (e.g., Ethernet, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computerized devices that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing devices associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call with a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the mobile computing device 610 the ability to browse a list of remotely stored application programs that the user may download over the network 650 and install on the mobile computing device 610. The application store 666 may serve as a repository of applications developed by third-party application developers. An application program that is installed on the mobile computing device 610 may be able to communicate over the network 650 with server systems that are designated for the application program. For example, a VoIP application program may be downloaded from the Application Store 666, enabling the user to communicate with the VoIP service 664.

The mobile computing device 610 may access content on the internet 668 through network 650. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

A voice recognition service 672 may receive voice communication data recorded with the mobile computing device's microphone 622, and translate the voice communication into corresponding textual data. In some examples, the translated text is provided to a search engine as a web query, and responsive search engine search results are transmitted to the mobile computing device 610.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program. Example cloud-based application programs include GOOGLE DOCS word processor and spreadsheet service, GOOGLE GMAIL webmail service, and PICASA picture manager.

Mapping service 680 can provide the mobile computing device 610 with street maps, route planning information, and satellite images. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program. Example services that provide streaming media include YOUTUBE and PANDORA.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network, but may not include the second device receiving the data. Conversely, "receiving" from a first device may include receiving the data from a network, but may not include the first device transmitting the data.

Figure 7:
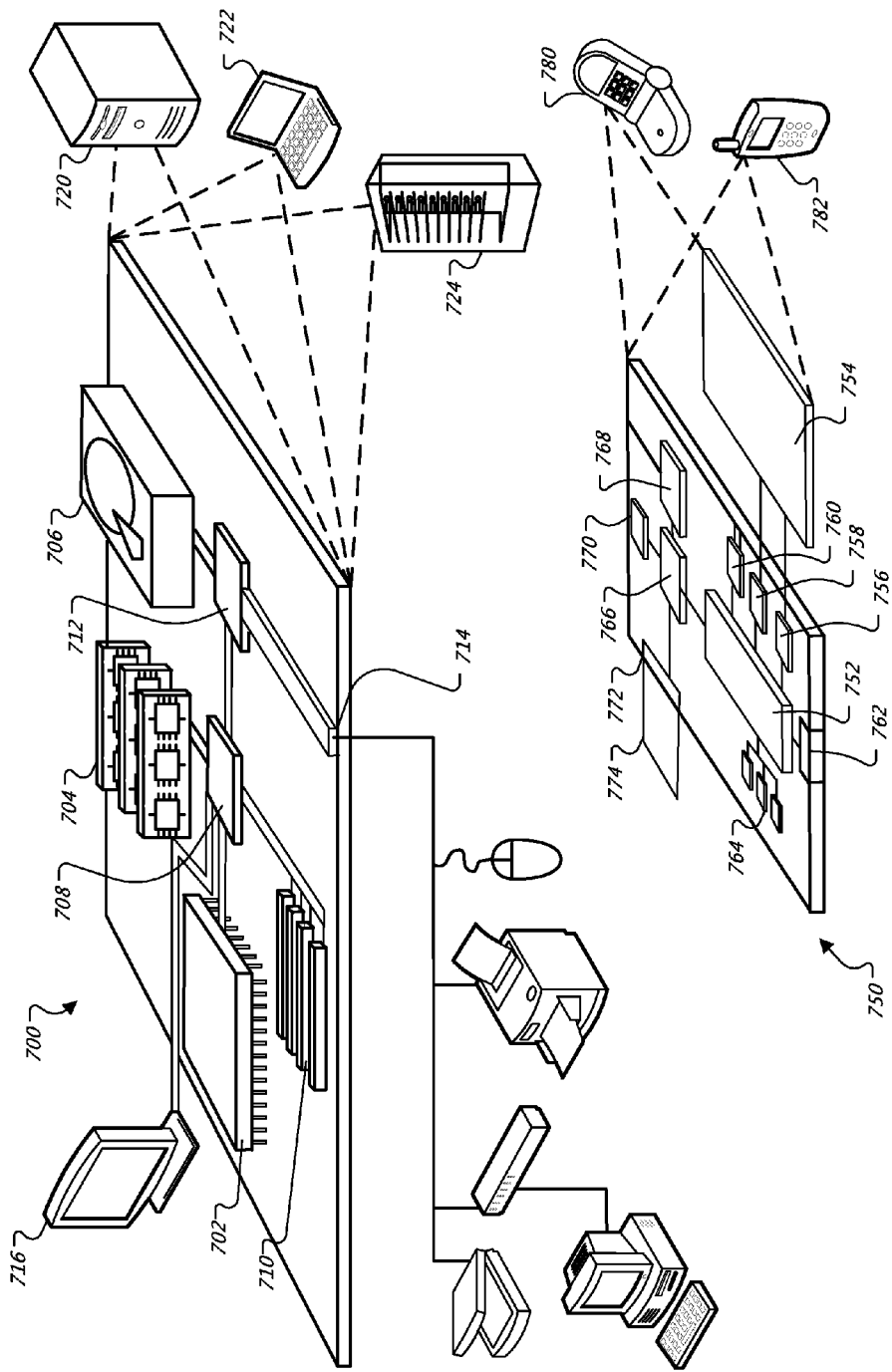
FIG. 7 is a block diagram of example computing devices.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 752 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for selecting operations to perform in response to non-touchscreen housing contact may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
    receiving, at a mobile computing device, first input on a touchscreen of the computing device, wherein the mobile computing device has a housing with at least i) a first side that includes the touchscreen and ii) a second side with a non-touch sensitive surface;
    in response to receiving the first input, causing a first operation to be performed by the mobile computing device;
    determining, in response to performing the first operation, a group of operations that includes the first operation;
    detecting, using one or more motion sensors that are located inside the housing of the mobile computing device, motion of the mobile computing device;
    determining, based on the detected motion of the mobile computing device, whether a user tapped the non-touch sensitive surface of the second side of the housing of the mobile computing device, wherein the user is determined to have tapped the non-touch sensitive surface responsive to the mobile computing device detecting a contact with the non-touch sensitive surface of the second side of the housing of the mobile computing device, the contact having at least a threshold level of force as detected by the one or more motion sensors, wherein the threshold level of force indicates a distinction between a tap and other contact with the mobile computing device that is below the threshold level of force;
    selecting, by the mobile computing device and in response to determining that the user tapped the non-touch sensitive surface of the second side of the housing, a second operation from the group of operations; and
    causing the second operation to be performed.

2. The computer-implemented method of claim 1, further comprising determining whether the non-touch sensitive surface of the second side of the housing that the user tapped is a back portion of the mobile computing device that is opposite the touchscreen of the mobile computing device; and
    wherein the second operation is additionally selected in response to the determination of whether the back of the mobile computing device was contacted.

3. The computer-implemented method of claim 2, further comprising identifying a location on the back portion of the mobile computing device where the user tapped the housing based on the received input; and
    wherein the second operation is additionally selected based on the identified location at which the user tapped the back of the mobile computing device.

4. The computer-implemented method of claim 3, wherein the location where the user tapped the housing indicates user intent to navigate forward or backward through a document comprising a plurality of pages; and
    wherein the second operation comprises moving a display of the document on the mobile computing device forward or backward through the plurality of pages.

5. The computer-implemented method of claim 3, wherein the location where the user tapped the housing is identified using the one or more motion sensors positioned in the mobile computing device.

6. The computer-implemented method of claim 5, wherein the one or more motion sensors comprise one or more accelerometers; and
wherein the location is identified based on an amount of torque measured in association with the received input by the one or more accelerometers relative to locations of the one or more accelerometers in the mobile computing device.

7. The computer-implemented method of claim 5, wherein the one or more motion sensors comprise one or more gyroscopes; and
wherein the location is identified based on an amount of rotation and a direction of rotation in association with the received input that is measured by the one or more gyroscopes relative to locations of the one or more gyroscopes in the mobile computing device.

8. The computer-implemented method of claim 3, wherein the location where the user tapped the housing is identified using a plurality of microphones positioned in the housing of the mobile computing device; and
wherein the location is identified based on a correlation of audio signals received by the plurality of microphones relative to locations of the plurality of microphones in the housing of the mobile computing device.

9. The computer-implemented method of claim 1, wherein the user tapped the second side of the housing of the mobile computing device with one or more of the user's fingers or thumbs.

10. The computer-implemented method of claim 1, wherein the second operation is the same as the first operation.

11. The computer-implemented method of claim 1, wherein the second operation is different from the first operation.

12. The computer-implemented method of claim 1, wherein the mobile computing device comprises a smartphone or a tablet computing device.

13. The computer-implemented method of claim 1, further comprising providing, by the mobile computing device, output that indicates that the user tapping the second side of the housing was received as second input by the mobile computing device.

14. The computer-implemented method of claim 13, wherein the output includes one or more of: changing a display of the mobile computing device for at least a threshold period of time and providing an audio signal through one or more speakers of the mobile computing device.

15. The computer-implemented method of claim 1, further comprising:
detecting a level of force with which the user tapped the non-touch sensitive surface of the second side of the housing of the mobile computing device; and
identifying a type of tap based on a comparison of the level of force with one or more of a plurality of second threshold levels of force;
wherein the second operation is selected further based on the identified type of tap for the second input.

16. The computer-implemented method of claim 1, further comprising:
detecting, using the one or more motion sensors, a second motion of the mobile computing device;
determining, based on input from the one or more motion sensors, a level of force associated with the second motion of the mobile computing device;
determining, based on the level of force associated with the second motion of the mobile computing device being less than the threshold level of force and greater than a second threshold level of force, that the user has ambiguously contacted the non-touch sensitive surface of the second side of the housing of the mobile computing device; and
in response to determining that the user has ambiguously contacted the non-touch sensitive surface, causing a preview operation to be performed by the mobile computing device that previews another operation of the mobile computing device.

17. The computer-implemented method of claim 16, wherein the other operation is a preview of the first operation that was previously performed on the mobile computing device.

18. A mobile computing device comprising:
a touchscreen;
a housing with at least i) a first side that includes the touchscreen and ii) a second side with a non-touch sensitive surface;
one or more sensors that are located inside the housing and that are configured to detect movement of the mobile computing device;
an input subsystem that is programmed to receive first input on the touchscreen of the computing device;
a contact detection module that is programmed to determine whether a user has tapped the non-touch sensitive surface of the second side of the housing based, at least in part, on movement of the mobile computing device as detected by the one or more sensors, wherein the movement of the mobile computing device is determined to correspond to a threshold level of force as detected by the one or more sensors, the threshold level of force indicating a distinction between a tap and other contact with the mobile computing device that is below the threshold level of force;
a previous operation tracker that is programmed to manage a group of operations that includes the first operation;
an operation selection module that is programmed to select i) a first operation to perform in response to the first input and ii) a second operation from among the group of operations, wherein the first operation was added to the group of operations by the previous operation tracker after the first operation was performed; and
a contact interpreter to cause the selected second operation to be performed.

19. A computer program product embodied in a computer-readable storage device storing instructions that, when executed, cause one or more processors of a computer system to perform operations comprising:
receiving first input on a touchscreen of the computer system, wherein the computer system has a housing with at least i) a first side that includes the touchscreen and ii) a second side with a non-touch sensitive surface;
in response to receiving the first input, causing a first operation to be performed by the computer system;
determining, in response to performing the first operation, a group of operations that includes the first operation;
detecting, using one or more motion sensors that are located inside the housing of the computer system, motion of the computer system;
determining, based on the detected motion of the computer system, whether a user tapped the non-touch sensitive surface of the second side of the housing of the computer system, wherein the user is determined to have tapped the non-touch sensitive surface responsive to the computer system detecting a contact with the non-touch sensitive surface of the second side of the housing of the mobile computing device, the contact having at least a threshold level of force as detected by the one or motion sensors, wherein the threshold level of force indicates a distinction between a tap and other contact with the mobile computing device that is below the threshold level of force;

selecting, in response to determining that the user tapped the non-touch sensitive surface of the second side of the housing, a second operation from the group of operations; and causing the second operation to be performed.

20. The computer-implemented method of claim 1, wherein the group of operations comprises a sequence of operations that were previously performed by the mobile computing device in response to user input;

the method further comprising:

identifying patterns of user input on the mobile computing device based on analysis of the user's historical behavior on the mobile computing device;

determining whether the sequence of operations matches one or more of the identified patterns of user input;

wherein the second operation is selected from the group of operations further based on a particular pattern of user input from the identified patterns that is determined to match the sequence of previous operations, the second operation being a next operation in the particular pattern that has not yet been performed by the user as part of the sequence of operations.

21. The computer-implemented method of claim 1, wherein determining whether the user tapped the non-touch sensitive surface of the second side of the housing of the mobile computing device comprises processing signals received from the one or more motion sensors that are located inside the housing of the mobile computing device, without processing signals from other sensors that are located outside the housing of the mobile computing device.

22. The computer-implemented method of claim 1, wherein the second operation is selected based at least in part on an amount of time that has elapsed or a number of operations that have been performed since the first operation was performed by the mobile computing device.

* * * * *